United States Patent [19]

Zneimer

[11] 4,124,874

[45] Nov. 7, 1978

[54] MAGNETIC INFORMATION TRANSDUCER ASSEMBLY

[75] Inventor: Joel E. Zneimer, Arcadia, Calif.

[73] Assignee: Bell & Howell Company, Chicago, Ill.

[21] Appl. No.: 719,747

[22] Filed: Sep. 2, 1976

[51] Int. Cl.² .......................... G11B 5/27; G11B 5/42
[52] U.S. Cl. ....................................... 360/121; 29/603
[58] Field of Search ....................... 360/121, 118, 8, 31

[56] References Cited

U.S. PATENT DOCUMENTS

| | | | |
|---|---|---|---|
| 2,885,488 | 5/1959 | Andrews | 360/121 |
| 3,357,005 | 12/1967 | Geurst et al. | 360/119 |
| 3,478,340 | 11/1969 | Schwartz et al. | 29/603 |
| 3,529,349 | 9/1970 | Van De Schoot et al. | 360/121 |
| 3,819,348 | 6/1974 | Murray | 29/603 |
| 3,842,494 | 10/1974 | Chiba et al. | 360/121 |

OTHER PUBLICATIONS

"Magnetic Recording", Lowman, McGraw-Hill, 1972, p. 35.

Primary Examiner—Robert S. Tupper
Attorney, Agent, or Firm—Benoit Law Corporation

[57] ABSTRACT

Apparatus for reproducing magnetically recorded information comprise first and second reproduce heads for reproducing magnetically recorded information from a magnetic recording channel alternatively at first and second tape speeds. These reproduce heads include spaced pairs of matching pole pieces defining air gaps, and spacer elements between these pairs of matching pole pieces. The pole pieces and spacer elements are bonded into a solid unit by a bonding material filling the air gaps and bonding the pole pieces in each pair, the spaced pairs and the spacer elements to each other. Magnetic yokes are magnetically coupled to the bonded pole pieces and electromagnetic windings are magnetically coupled to the yokes.

2 Claims, 2 Drawing Figures

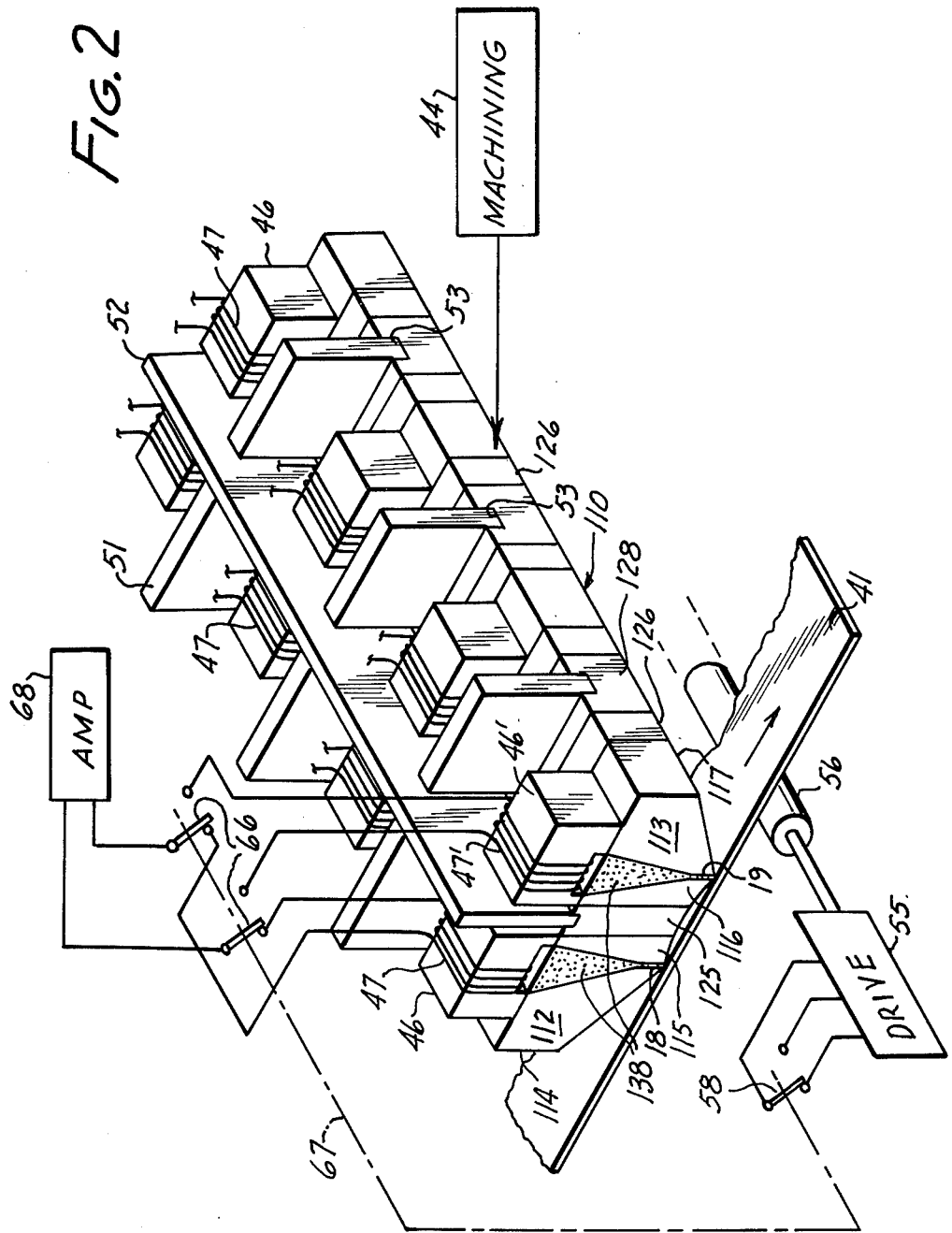

MAGNETIC INFORMATION TRANSDUCER ASSEMBLY

BACKGROUND OF THE INVENTION

1. Field of the Invention

The subject invention relates to magnetic information transducing and, more specifically, to magnetic information transducer assemblies and methods for making same.

2. Description of the Prior Art

In the instrumentation tape recorder field, normal practice is to make two separate reproduce heads for high and low tape speeds. When a head is designed to operate at high speed and wide band frequency (such as 120 inches per second — 2 MHz), the bandwidth is divided in half and the peak output is reduced by 6 db for each half reduction of the tape speed relative to the head. Since the speed and bandwidth are reduced in half, the wavelength of a recorded signal remains constant. When operating tape recorders at 1⅞ inches per second, signal-to noise ratios of approximately 10 db are obtained in comparison to signal-to-noise ratios of approximately 30 db for 120 inches per second — 2 MHz operation.

The problems implicit in these relationships and parameters have remained unsolved despite a multitude of proposals in the multigap and bonded heads arts, including the glass bonded — ferrite field, as may, for instance, be seen from U.S. Pat. Nos. 2,702,835, 3,024,318, 3,145,453, 3,246,383, 3,357,005, 3,369,292, 3,494,026, 3,526,725, 3,543,396, 3,672,004, and 3,797,031.

The contents of these references also point up a need for improvements in methods of manufacturing magnetic information transducer assemblies and magnetic information transducer assemblies produced thereby.

SUMMARY OF THE INVENTION

It is a general object of this invention to overcome the above mentioned disadvantages and satisfy the above mentioned needs.

It is a related object of this invention to provide improved methods of manufacturing magnetic information transducers.

It is a germane object of this invention to provide improved magnetic information transducers.

It is a similar object of this invention to provide improved methods for making bonded magnetic information transducer assemblies and of providing improved bonded magnetic information transducer assemblies.

It is also an object of this invention to improve the performance of magnetic information transducer assemblies for various speeds of the information recording medium.

It is a germane object of this invention to provide magnetic information transducer assemblies suitable for operation at various speeds of the information recording medium.

Other objects of the invention will become apparent in the further course of this disclosure.

From a first aspect thereof, the invention resides in a method of manufacturing a magnetic information transducer assembly and, more specifically, resides in the improvement comprising in combination the steps of providing pairs of matching pole piece blanks defining air gaps when assembled, providing spacer element blanks, assembling the matching pole piece blanks into pairs separated by the spacer element blanks, providing a bonding material for the pole piece blanks and spacer element blanks, and applying the bonding material to the assembled pole piece blanks and spacer element blanks to bond matching pole piece blanks in each pair to each other, to fill the air gaps, and to bond the assembled pole piece blanks and spacer element blanks into a solid unit.

From another aspect thereof, the invention resides in a method of manufacturing a magnetic information transducer assembly having an array of magnetic transducer heads arranged in rows to provide for information transducing operations in more than one information transducing channel and arranged in columns to provide for separate information transducing operations in each information transducing channel. The invention according to this aspect resides, more specifically, in the improvement comprising in combination the steps of providing pairs of matching pole piece blanks defining air gaps when assembled, providing spacer element blanks, assembling the matching pole piece blanks into pairs and arranging the latter pairs in rows and columns separated by the spacer element blanks, providing a bonding material for the pole piece blanks and spacer element blanks, and applying the bonding material to the assembled pole piece blanks arranged in rows and columns and to the spacer element blanks to bond matching pole piece blanks in each pair to each other, to fill the air gaps, and to bond the assembled pole piece blanks and spacer element blanks into a solid unit including rows and columns of pairs of bonded pole piece blanks.

From another aspect thereof, the subject invention resides in a method of manufacturing a magnetic information transducer and, more specifically, resides in the improvement comprising in combination the steps of providing a matching pair of pole piece blanks and providing the blanks with corresponding air gap boundary surfaces and with corresponding projections for maintaining the surfaces spaced for the provision of an air gap, assembling the pole piece blanks including placing the corresponding projections into mutual abutment to provide the air gap, providing a bonding material for the pole piece blanks, and applying the bonding material to the assembled pole piece blanks to fill the air gap and bond the assembled pole piece blanks to each other into a solid pole piece blank unit.

The subject invention also resides in magnetic information transducer assemblies made by any of the methods according to the subject invention.

From another aspect thereof, the invention resides in a magnetic information transducer assembly for magnetically transducing information relative to two magnetic recording channels comprising, in combination, four spaced pairs of matching pole pieces defining air gaps and being arranged in rows and columns with two of the spaced pairs being in a first row for magnetically transducing information relative to one of the magnetic recording channels, and the other two of the spaced pairs being in a second row for magnetically transducing information relative to the other of the magnetic recording channels, spacer elements between pairs of matching pole pieces in each row and between rows of pairs of matching pole pieces, a magnetic shielding element sandwiched between said rows of matching pole pieces, means for bonding the pole pieces, spacer elements and magnetic shielding elements into a solid unit, including a bonding material filling the air gaps and bonding the pole pieces in each pair, the spaced pairs and the spacer elements to each other, magnetic yoke devices magnetically coupled to the bonded pole pieces, and electromagnetic winding means magnetically coupled to the yoke devices.

From yet another aspect thereof, the invention resides in apparatus for reproducing magnetically recorded information from a magnetic recording channel on a magnetic recording tape at a first tape speed and alternatively reproducing magnetically recorded information from the magnetic recording channel at a second tape speed. The invention according to this aspect resides, more specifically, in the improvement comprising, in combination, first reproduce head means for reproducing magnetically recorded information from the magnetic recording channel at the first tape speed having a first pair of matching pole pieces with a first air gap extending transversely of the recording channel, a first magnetic yoke magnetically coupled to said first pair of matching pole pieces, and a first electromagnetic winding having a first number of turns on said first yoke, second reproduce head means for reproducing magnetically recorded information from the magnetic recording channel at the second tape speed having a second pair of matching pole pieces with a second air gap extending in parallel to the first air gap and transversely of the recording channel, a second magnetic yoke magnetically coupled to said second pair of matching pole pieces, and a second electromagnetic winding having on said second yoke a second number of turns different from said first number of turns, a spacer element between the first and second reproduce head means, and a bonding material filling the first and second air gaps and bonding the first and second pairs of matching pole pieces and the spacer element into an integral unit.

BRIEF DESCRIPTION OF THE DRAWINGS

The subject invention and its objects and aspects will become more readily apparent from the following detailed description of preferred embodiments thereof, illustrated by way of example in the accompanying drawings, in which like reference numberals designate like or functionally equivalent parts, and in which:

FIG. 2 is a perspective view of a magnetic information transducer assembly in accordance with a preferred embodiment of the subject invention, together with a diagrammatic showing of associated equipment.

Figure 1:
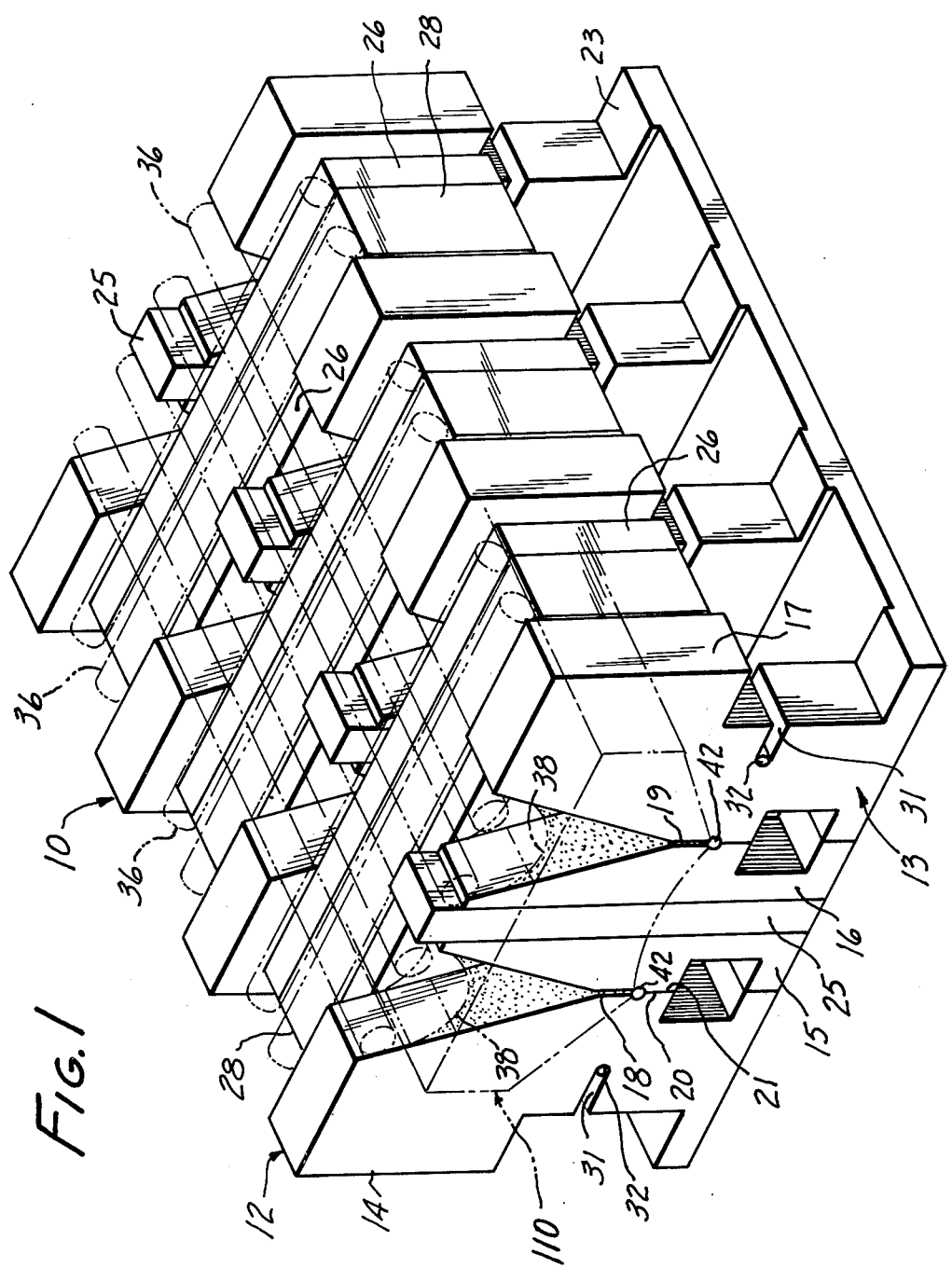
FIG. 1 is a perspective view of an assembly of pole piece blanks, spacer element blanks and bonding material therefor for manufacturing a magnetic information transducer assembly according to a preferred embodiment of the subject invention.

With reference to the drawings, and also in the summary of the invention and in some of the claims, the expressions "rows" and "columns" are used. Without limiting the generality of these expressions, it may be helpful to refer to the drawings, and in particular to FIG. 2 thereof, which show pole piece pairs 112 and 113 arranged in two columns and four rows, with the rows corresponding to information recording and/or playback channels or tracks on the recording tape 41, and with the columns extending across these channels.

DESCRIPTION OF THE PREFERRED EMBODIMENTS

The basic assembly 10 shown in FIG. 1 is manufactured by providing pairs 12 and 13 of matching pole piece blanks 14 and 15, and 16 and 17, defining air gaps 18 and 19, respectively, when assembled. In particular, the pole piece blanks 14 to 17 may be provided with corresponding air gap boundary surfaces at the gaps 18 and 19 and with corresponding projections 20 and 21 adjacent the gap 18 for maintaining the air gap boundary surfaces spaced for the provision of the air gap 18. Similar air gap boundary surfaces and corresponding projections may be provided for realizing the air gaps of the other pole piece pairs. The pole piece blanks 14 et seq. may be machined out of a solid piece of a soft magnetic material of the type used in magnetic recording and playback heads. In accordance with a preferred embodiment of the subject invention, the soft magnetic material used for making the pole piece blanks is a ferrite, such as a manganese zinc or nickel zinc ferrite. The ferrite may be hot pressed in a manner known in the magnetic information transducer manufacturing field. Exemplary ferrites include the ferrites available under the trade name or mark Ferroxcube 3 and Type 5043.

As seen in FIG. 1, corresponding pole piece blanks 17 etc. of the same column of pole piece blank pairs may be machined out of the same block of soft magnetic material, in order to provide a machined piece 23 having the corresponding pole piece blanks integrally projecting therefrom.

The assembly 10 according to the illustrated preferred embodiment has matching pole piece blanks arranged in two columns and four rows for magnetic transducing operations in four channels at either one or both of two gaps per channel.

According to the illustrated preferred embodiment, there are further provided spacer element blanks 25 and 26 which are employed to maintain the matching pole piece blank pairs separated from each other. In other words, the matching pole piece blanks are assembled into pairs separated by the spacer element blanks 25 and 26, with the spacer element blanks 25 separating the pole piece blank pairs of different columns in the same row, while the blanks 26 space adjacent rows of pole piece blank pairs from each other.

The assembly 10 may also include magnetic shielding element blanks which, as their name implies, will magnetically shield adjacent pole pieces from each other in the operation of the resulting transducer assembly. In the illustrated preferred embodiment, magnetic shielding element blanks 28 are sandwiched between adjacent rows of pole piece blank pairs or between adjacent spacer element blanks 26, as shown in FIG. 1.

The spacer element blanks 25 and 26 are preferably made of a non-magnetic material, such as glass or a ceramic, for instance, alumina, steatite or fosterite.

The shielding element blanks 28 may be made from a shielding material, such as a ferrite shield, as conventionally used in magnetic transducer head assemblies.

In the illustrated preferred embodiment, the outer pole piece blanks 14 and 17 in each column have lateral notches 31 for accommodating appropriate mounting devices. As shown in FIG. 1, the mounting device in each columnar series of notches 31 may comprise a wire, part of which is seen at 32 in FIG. 1. By way of example, the wire 32 may be made of inconel or another temperature-resistant material. The sandwiched spacer element blank 26 and shielding element blanks 28 may be supported in their illustrated position by the inserted wires 32.

Each of the air gaps 18 etc. may be provided with a spacer of glass, alumina, silver, ceramic or any other non-magnetic spacer material. If desired, the spacers in the air gap may be provided in the same operation as the bonding of the pole piece, spacer and shielding element blanks.

In principle, a large number of bonding materials are available for this purpose, including glass or a resin, such as an epoxy or polyester resin. The prepared bonding material is applied to the assembled pole piece blanks 14, etc., spacer element blanks 25 and 26 and magnetic shielding element blanks 28 to bond matching pole piece blanks in each pair to each other, to fill the air gaps 18 and 19 as necessary, and to bond the assembled pole piece blanks and spacer element blanks into a solid, integral unit.

In the case of a resin, the application of the bonding material includes an application of a fluid or uncured resin and a subsequent curing, hardening or solidification of the applied resin.

If the bonding material is glass, then it is presently preferred that pieces or rods of glass 36 be placed on the assembled unit 10, such as shown in FIG. 1, and be thereupon melted down by the application of heat or in an oven. Of course, the skilled designer will in a conventional manner effect the selection of the various materials involved in the assembly 10 among materials having similar thermal coefficients of expansion for the provision of a monolithic assembly.

If desired, the assembly 10 may be placed into a conventional mold (not shown) which prevents an escape of the fluid bonding material during the bonding process, where this should be a problem. During the bonding process, the bonding material is formed or is permitted to form itself by weight of gravity into fillets or fairings 38 between corresponding blanks of each pair of pole piece blanks.

The assembled and bonded unit 10 shown in FIG. 1 is machined to the shape shown toward the lower portion of FIG. 2, with the machined parts being designated in FIG. 2 by reference numerals to which the amount of 100 has been added relative to the reference numerals to their corresponding blanks in the assembly of FIG. 1.

As will be noted from FIG. 2, the bonded unit 10 of FIG. 1 has been machined into a magnetic information transducer pole piece assembly 110 including pole piece pairs 112 and 113 arranged in two columns and four rows with the columns being separated by spacer elements 125 and the rows being separated by spacer elements 126 having magnetic shielding elements 128 sandwiched therebetween as shown in FIG. 2.

By a comparison of FIGS. 1 and 2, it will particularly be noted that portions of the pole piece blanks including the above mentioned projections 20 and 21 have been cut and machined away from the retained pole piece portions so as to expose the air gap to a suitable magnetic recording and/or playback medium or tape 41. To facilitate this process, the assembled pole piece blanks define apertures 42 between the air gaps 18 and 19, as shown in FIG. 1.

The machining as such may proceed with diamond tooling if desired, and in any other conventional manner, illustrated broadly in FIG. 2 by a block 44. To aid those skilled in the art to carry the illustrated embodiment of the invention into practice, an outline of the machined, resulting magnetic information transducer 110 has been shown in the unit 10 of FIG. 1.

Further according to FIG. 2, there is provided a yoke 46 for each pole piece, pair or unit and an electromagnetic winding 47 for each yoke.

The yokes 46 may be made of ferrite or of any other magnetic material conventionally used for magnetic return paths.

The yokes 46 with windings 47 are applied to the pole piece pairs or units with the aid of a suitable adhesive or other fastening means (not shown).

Upon application of the wound yokes 46, a transducer assembly is present having an array of magnetic transducer heads arranged in rows and columns.

If desired, and as shown in FIG. 2, further magnetic shielding elements 51 and 52, arranged for instance in an egg crate type of structure, may be provided between transducer yokes 46 of adjacent columns and of adjacent rows, respectively. Grooves 53 may be provided in the other magnetic shielding elements 128 to maintain the further shielding elements in place. The further shielding elements 51 and 52 may be made of mu-metal or any shielding material conventionally used for this purpose.

In practice, a magnetic information recording medium or tape 41 is moved relative to the heads at the air gaps 18 and 19. In reality, the medium 41 extends, of course, across the entire transducer head assembly, whereby simultaneous transducing operations may take place in four channels on the medium 41 corresponding to the four rows of transducing heads.

A conventional tape drive 55 is only diagrammatically shown in FIG. 2 as advancing the tape with the aid of a tape drive capstan 56. The drive 55 has at least two operating speeds in the tape forward direction, as indicated by the double-row switch or commutator 58 in FIG. 2.

As shown in FIG. 2, each row of transducing heads includes two spaced pairs of matching pole pieces having parallel air gaps 18 and 19 filled by the bonding material as necessary and extending in a mutually parallel relationship. In principle, the two heads of each row could be used for different purposes, such as recording-playback and the like. However, in accordance with the illustrated preferred embodiment of the invention, both heads of each row are used for reproducing magnetically recorded information from a magnetic recording channel on the magnetic recording tape 41 at a first and alternatively at a second tape speed, respectively. By way of example, the means for reproducing the information at the first tape speed includes a first magnetic reproduce head 112 having a first air gap 18 extending transversely of the recording channel on the tape 41. The means for reproducing the information at the second tape speed include a second magnetic reproduce head 113 having a second air gap 19 extending in parallel to the first air gap 18 and transversely of the recording channel on the tape 41.

The spacer element 125 is located between the first and second reproduce heads 112 and 113, and a bonding material 138 fills the first and second air gaps as necessary and bonds the first and second reproduce heads or first and second pairs of matching pole pieces 114, 115, 116, 117 and the spacer element into an integral unit. The first magnetic reproduce head 112 has the first pair of matching pole pieces 114 and 115 bonded to each other by the bonding material 138, and the second magnetic reproduce head 113 has the second pair of matching pole pieces 116 and 117 bonded to each other by that bonding material.

The first magnetic reproduce head 112 further has a first magnetic yoke 46 magnetically coupled to the first pair of matching pole pieces 114 and 115, and the second magnetic reproduce head 113 has a second magnetic yoke magnetically coupled to the second pair of matching pole pieces 116 and 117 and is separate from the first magnetic yoke.

The first magnetic reproduce head 112 further has a first electromagnetic winding 47 having a first number of turns on the first yoke, and the second magnetic reproduce head 113 has a second electromagnetic winding 47' having on the second yoke 46' a second number of turns different from the first number of turns of the winding 47.

By way of example, the second number of turns of the winding 47' may be on the order of one-hundred times the first number of turns of the winding 47.

More specifically, the winding 47 may be provided with approximately 60 to 70 turns in order to keep the resonance frequency of the head 112 above 2 MHz for a 120 inches per second — 2 MHz playback operation relative to the tape 41. By contrast, one could provide the winding 47' with 600 to 700 turns to keep the resonance frequency of the reproduce head above 125 kHz for a 7½ inches per second - 125 kHz operation. The reproduce head 113 could then also be operated at 15/16 inches per second of tape speed and 16 kHz.

If desired, double-throw switches 66 for the windings 47 and 47' may be ganged as indicated by a phantom line 67 with the tape drive speed switch 58 so that the appropriate reproduce head 112 or 113 is automatically connected to the symbolically illustrated electronic reproduce equipment 68 at the different tape speeds.

The subject extensive disclosure will render apparent or suggest various modifications and variations within the spirit and scope of the subject invention to those skilled in the art.

For instance, the number of rows could be decreased or increased relative to the number of four shown in the drawings, depending on the number of recording channels desired in a given application. More significantly, the number of columns could be increased beyond the number of two shown in the drawings if more than two heads per channel are desired. For example, four columns for four heads per channel could be provided in a four speed machine.

I claim:

1. In apparatus for reproducing magnetically recorded information from a magnetic recording channel on a magnetic recording tape at a first tape speed and alternatively reproducing magnetically recorded information from the magnetic recording channel at a second tape speed, the improvement comprising in combination:

first reproduce head means for reproducing magnetically recorded information from the magnetic recording channel at said first tape speed having a first pair of matching pole pieces with a first air gap extending transversely of said recording channel, a first magnetic yoke magnetically coupled to said first pair of matching pole pieces, and a first electromagnetic winding having a first number of turns on said first yoke;

second reproduce head means for reproducing magnetically recorded information from the magnetic recording channel at said second tape speed having a second pair of matching pole pieces with a second air gap extending in parallel to said first air gap and transversely of said recording channel, a second magnetic yoke magnetically coupled to said second pair of matching pole pieces, and a second electromagnetic winding having on said second yoke a second number of turns different from said first number of turns;

a spacer element between said first and second reproduce head means; and a bonding material filling said first and second air gaps and bonding said first and second pairs of matching pole pieces and said spacer element into an integral unit.

2. An apparatus as claimed in claim 1, wherein:
said second number of turns is on the order of one-hundred times said first number of turns.

* * * * *